(12) United States Patent  
Biesheuvel et al.

(10) Patent No.: US 9,725,231 B2  
(45) Date of Patent: Aug. 8, 2017

(54) SYSTEM, METHOD AND CAPSULE FOR PREPARING A BEVERAGE

(71) Applicant: Koninklijke Douwe Egberts B.V., Utrecht (NL)

(72) Inventors: Arend Cornelis Jacobus Biesheuvel, Utrecht (NL); Ralf Kamerbeek, Utrecht (NL); Kon Euan Gerard Wong, Utrecht (NL); Guido Brandt, Utrecht (NL); Hendrik Cornelis Koeling, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 14/471,983

(22) Filed: Aug. 28, 2014

(65) Prior Publication Data

US 2014/0370164 A1   Dec. 18, 2014

Related U.S. Application Data

(62) Division of application No. 12/532,106, filed as application No. PCT/NL2008/050540 on Aug. 8, 2008, now Pat. No. 8,850,960.

(30) Foreign Application Priority Data

Jan. 29, 2008   (EP) .................... 08150807

(51) Int. Cl.
*A47J 31/44*   (2006.01)
*B65D 85/804*   (2006.01)
(Continued)

(52) U.S. Cl.
CPC ............ *B65D 85/8043* (2013.01); *A23F 5/18* (2013.01); *A47J 31/0673* (2013.01);
(Continued)

(58) Field of Classification Search
CPC ... B65D 85/804; A47J 31/368; A47J 31/0673; A47J 31/0678; A47J 31/3695
(Continued)

(56) References Cited

U.S. PATENT DOCUMENTS 2,372,406 A * 3/1945 Treneer ...................... 426/106  
3,433,464 A   3/1969 Swafford et al.  
(Continued)

FOREIGN PATENT DOCUMENTS

BE   552534   5/1957  
CH   605293   9/1978  
(Continued)

*Primary Examiner* — Thien S Tran  
(74) *Attorney, Agent, or Firm* — Foley & Lardner LLP

(57) ABSTRACT

The invention relates to a system, method and capsule for preparing a predetermined quantity of beverage suitable for consumption using an extractable product. The system comprises an exchangeable capsule, and an apparatus comprising a receptacle for holding the exchangeable capsule, and a fluid dispensing device for supplying a fluid to the exchangeable capsule. The exchangeable capsule comprises a circumferential wall, a bottom, and a lid. The wall, bottom and lid enclose an inner space comprising the extractable product. The receptacle comprises bottom piercing means intended for piercing an entrance area of an alternative capsule for creating at least one entrance opening for supplying the fluid to the extractable product. The entrance area of the capsule according to the invention comprises an entrance filter for supplying the fluid to the extractable product there through. In use, the entrance filter is positioned at a distance from the bottom piercing means, such that the capsule of the system is not pierced by the bottom piercing means.

27 Claims, 8 Drawing Sheets

(51) Int. Cl.
  *A23F 5/18* (2006.01)
  *A47J 31/06* (2006.01)
  *A47J 31/36* (2006.01)

(52) U.S. Cl.
  CPC ....... *A47J 31/0678* (2013.01); *A47J 31/3695* (2013.01); *A47J 31/368* (2013.01)

(58) Field of Classification Search
  USPC ......... 99/275, 279, 283, 295, 302 P; 426/77, 426/110, 431, 416
  See application file for complete search history.

(56) References Cited

U.S. PATENT DOCUMENTS

| | | | |
|---|---|---|---|
| 3,878,772 A | | 4/1975 | Nordskog |
| 4,136,202 A | | 1/1979 | Favre |
| 4,253,385 A | * | 3/1981 | Illy ............................... 99/281 |
| 4,694,740 A | | 9/1987 | Daloz |
| 4,860,645 A | * | 8/1989 | van der Lijn ...... B65D 85/8043 210/482 |
| 4,882,982 A | | 11/1989 | Muttoni |
| 4,995,310 A | | 2/1991 | Van Der Lijn et al. |
| 5,150,645 A | | 9/1992 | Schiettecatte |
| 5,242,702 A | | 9/1993 | Fond |
| 5,265,519 A | | 11/1993 | Schiettecatte et al. |
| 5,402,707 A | | 4/1995 | Fond et al. |
| 5,472,719 A | | 12/1995 | Favre |
| 5,637,335 A | | 6/1997 | Fond et al. |
| 5,638,740 A | | 6/1997 | Cai |
| 5,656,311 A | | 8/1997 | Fond |
| 5,897,899 A | | 4/1999 | Fond |
| 5,948,455 A | | 9/1999 | Schaeffer et al. |
| 6,026,732 A | | 2/2000 | Kollep et al. |
| 6,412,394 B2 | | 7/2002 | Bonanno |
| 6,499,689 B1 | | 12/2002 | Miyazaki |
| 6,769,352 B2 | | 8/2004 | De Bruin et al. |
| 6,840,158 B2 | | 1/2005 | Cai |
| 2001/0052294 A1 | | 12/2001 | Schmed |
| 2002/0022070 A1 | | 2/2002 | Dijs |
| 2003/0096038 A1 | | 5/2003 | Cai |
| 2003/0172813 A1 | | 9/2003 | Schifferle |
| 2004/0107841 A1 | | 6/2004 | Cai |
| 2005/0150390 A1 | | 7/2005 | Schifferle |
| 2005/0150391 A1 | | 7/2005 | Schifferle |
| 2006/0107841 A1 | | 5/2006 | Schifferle |
| 2006/0110507 A1 | * | 5/2006 | Yoakim et al. ................ 426/433 |
| 2006/0230942 A1 | | 10/2006 | Noordhuis |
| 2006/0236871 A1 | * | 10/2006 | Ternite et al. ................... 99/295 |
| 2006/0266222 A1 | | 11/2006 | Hammad |
| 2007/0128318 A1 | | 6/2007 | Gerke |
| 2007/0148290 A1 | | 6/2007 | Ternite et al. |
| 2007/0224319 A1 | | 9/2007 | Yoakim et al. |
| 2009/0007793 A1 | | 1/2009 | Glucksman et al. |
| 2009/0007796 A1 | * | 1/2009 | Ricotti ................ A47J 31/0668 99/295 |
| 2009/0126577 A1 | | 5/2009 | Ternite |

FOREIGN PATENT DOCUMENTS

| | | | |
|---|---|---|---|
| DE | 19 89 147 | 7/1968 | |
| DE | 40 37 366 | 5/1992 | |
| DE | 42 13 895 A1 | 11/1992 | |
| DE | 41 92 762 | 1/1993 | |
| DE | 691 05 494 | 4/1995 | |
| DE | 44 24 835 | 1/1996 | |
| DE | 692 10 084 | 9/1996 | |
| DE | 692 17 113 | 5/1997 | |
| DE | 20218335 | 3/2003 | |
| DE | 6020040 07 883 | 4/2008 | |
| DE | 6020040 10 435 | 10/2008 | |
| EP | 0 419 31 | 12/1981 | |
| EP | 0 326 685 A2 | 8/1986 | |
| EP | 0 512 468 | 11/1992 | |
| EP | 0 512 470 | 11/1992 | |
| EP | 0 521 186 | 1/1993 | |
| EP | 0 521 510 | 1/1993 | |
| EP | 0 615 921 | 9/1994 | |
| EP | 0 806 373 | 11/1997 | |
| EP | 0 878 158 | 11/1998 | |
| EP | 1 092 377 | 4/2001 | |
| EP | 1 163 869 B1 | 12/2001 | |
| EP | 1 210 893 | 6/2002 | |
| EP | 1 295 554 | 3/2003 | |
| EP | 1 344 722 B2 | 9/2003 | |
| EP | 1 398 279 | 3/2004 | |
| EP | 1 555 219 B1 | 7/2005 | |
| EP | 1 566 127 | 8/2005 | |
| EP | 1 579 791 | 9/2005 | |
| EP | 1 580 143 | 9/2005 | |
| EP | 1 580 144 | 9/2005 | |
| EP | 1 654 966 B1 | 12/2006 | |
| EP | 1 795 460 | 6/2007 | |
| EP | 1 839 543 A1 | 10/2007 | |
| EP | 1 854 741 | 11/2007 | |
| EP | 1 816 935 B1 | 1/2009 | |
| EP | 1 826 148 B1 | 5/2010 | |
| EP | 2 103 236 B1 | 5/2010 | |
| FR | 2127329 | 10/1972 | |
| FR | 2206923 | 6/1974 | |
| FR | 2282838 | 3/1976 | |
| FR | 2617389 A1 | 1/1989 | |
| FR | 2905683 | 3/2008 | |
| GB | 0 989 996 | 4/1965 | |
| IT | WO 2007093355 A1 * | 8/2007 | .......... A47J 31/0668 |
| JP | 2001-70163 | 3/2001 | |
| JP | 2005-65961 | 3/2005 | |
| NL | 7215523 | 5/1974 | |
| NL | 1013270 C2 | 4/2001 | |
| TW | 200536502 | 11/2005 | |
| WO | WO 86/02537 | 5/1986 | |
| WO | WO-89/12416 A2 | 12/1989 | |
| WO | WO 93/17932 | 9/1993 | |
| WO | WO-95/25457 | 9/1995 | |
| WO | WO-00/16674 | 3/2000 | |
| WO | WO-03/073896 | 9/2003 | |
| WO | WO-2004/005136 | 1/2004 | |
| WO | WO-2004/056246 A1 | 7/2004 | |
| WO | WO-2004/083071 A1 | 9/2004 | |
| WO | WO-2005/016095 | 2/2005 | |
| WO | WO-2005/058109 | 6/2005 | |
| WO | WO-2005/063094 | 7/2005 | |
| WO | WO-2005/092160 | 10/2005 | |
| WO | WO-2005/099534 | 10/2005 | |
| WO | WO-2005/105609 A3 | 11/2005 | |
| WO | WO-2006/016813 | 2/2006 | |
| WO | WO-2006/053635 | 5/2006 | |
| WO | WO-2006/078162 | 7/2006 | |
| WO | WO 2006078162 A1 * | 7/2006 | .......... B65D 85/804 |
| WO | WO-2006/126104 A2 | 11/2006 | |
| WO | WO-2007/114685 A1 | 10/2007 | |
| WO | WO-2008/136026 | 11/2008 | |
| WO | WO-2009/021756 | 2/2009 | |

* cited by examiner

SYSTEM, METHOD AND CAPSULE FOR PREPARING A BEVERAGE

CROSS-REFERENCE TO RELATED PATENT APPLICATIONS

This application is a divisional of U.S. application Ser. No. 12/532,106, which is the national stage of PCT/NL2008/050540, filed Aug. 8, 2008, which claims benefit to European Patent Application 08150807.9, filed Jan. 29, 2008, all of which are incorporated herein by reference in their entireties.

BACKGROUND

The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area and the system is arranged for bringing the fluid dispensing device in fluid connection with the entrance area for supplying the fluid to the extractable product for preparing the beverage, and wherein the lid comprises an exit area and the system comprises an outlet which, in use, is in fluid communication with the exit area for draining the prepared beverage from the capsule and supplying the beverage to a container such as a cup.

Such systems are known per se. A special class of these known systems is used for preparing the beverage using a hermetically sealed capsule comprising the extractable product. During beverage preparation the entrance area of such hermetically sealed capsule is pierced, hence providing at least one entrance opening for supplying the fluid under pressure to the exchangeable product in the inner space of the capsule through the entrance opening. Providing the fluid under pressure to the inner space causes the pressure in the inner space of the capsule to rise. This, in turn, causes the exit area of the capsule to be pressed against lid piercing means present in the receptacle. When the exit area is pressed against the lid piercing means with sufficient force, the exit area tears against the lid piercing means creating at least one exit opening through which the beverage can drain from the capsule.

It has been found, however, that in the above known systems preferential paths of fluid flow may occur in the extractable product within the capsule, e.g. from the at least one entrance opening to the at least one exit opening, which may lead to undesired strength of the prepared beverage and/or variations in strength of the prepared beverage, from one capsule to another.

It is an object of the invention to improve the above system, and more specifically to at least diminish the above problem.

Thereto, according to a first aspect of the invention, a system is provided wherein the receptacle comprises bottom piercing means intended for piercing the entrance area of an alternative capsule, e.g. a hermetically sealed capsule of the known system, for creating at least one entrance opening for supplying the fluid to the extractable product through said at least one entrance opening, and wherein the entrance area of the capsule of the system according to the invention comprises an entrance filter, for supplying the fluid to the extractable product there through, which entrance filter, in use, is positioned at a distance from the bottom piercing means, such that the capsule of the system is not pierced by the bottom piercing means and the bottom stays intact.

Thus it is possible to supply the fluid to the extractable product within the capsule without piercing the capsule. Thus, the entrance filter forms an, optionally uniform, entrance area through which the fluid can be supplied to the capsule. This provides the advantage that it is possible for the beverage to enter the capsule over a larger area than when entrance openings are pierced in the known systems, thus diminishing the risk of preferential fluid paths occurring in the extractable product in the capsule and enhancing the reproducibility of the beverage strength.

Further, it has been found that providing the entrance filter reduces the risk of extractable product remains spilling from the capsule when removing the capsule from the apparatus.

Preferably, the exchangeable capsule comprises an amount of extractable product, and thus is suitable and intended, for preparing a single portion of the beverage, preferably a single cup of the beverage, e.g. from 30-200 ml of the prepared beverage. The exchangeable capsule, thus, is a single-portion-pack. In an embodiment, the capsule comprises 4-8 grams, preferably approximately 7 grams of extractable product, e.g. roasted and ground coffee.

Preferably, the exchangeable capsule is disposable after single use.

According to a second aspect of the invention, a system is provided wherein the receptacle comprises lid piercing means intended for piercing the exit area of an alternative capsule, e.g. a hermetically sealed capsule of the known system, when the exit area sufficiently presses against the lid piercing means under the influence of the pressure of the fluid and/or beverage in the capsule for creating at least one exit opening through which the beverage can drain from the alternative capsule, and wherein the exit area of the capsule of the system according to the invention comprises an exit filter, through which the beverage can drain from the capsule of the system according to the invention, wherein the lid piercing means and the exit filter are adapted to each other such that the capsule of the system, in use, is not pierced by the lid piercing means and the lid stays intact.

Thus, the exit filter forms a, optionally uniform, exit area through which the beverage can leave the capsule. This provides the advantage that it is possible for the beverage to leave the capsule over a larger area than when exit openings are formed by piercing the lid, thus diminishing the risk of preferential fluid paths occurring in the extractable product in the capsule and enhancing the reproducibility of the beverage strength. Further, the capsule not being pierced by the lid piercing means, and staying intact, provides the advantage that a predetermined pore and/or exit hole size and distribution of the exit filter, defining exit openings of the exit filter, remains intact, so that the size and distribution of exit openings does not depend on chance, as when the exit openings are formed by piercing.

Moreover, it has been found that providing the exit filter reduces the risk of extractable product remains spilling from the capsule when removing the capsule from the apparatus.

Further, if the extractable product is roasted and ground coffee, providing the exit filter provides the advantage that the exit filter may filter oils from the beverage, i.e. from the coffee, before supplying the coffee to the container, such as the cup. This may be advantageous to remove oils from the coffee which adversely affect the taste and/or quality of the coffee. It is especially advantageous to filter cafestol from the coffee, since cafestol is understood to raise the blood cholesterol content. Thus, providing the exit filter may improve the quality of the coffee with respect to consumer health.

Preferably, the exit filter is adapted to the lid piercing means, such that the capsule of the system, in use, is not pierced by the lid piercing means and the lid stays intact. Hence, only parameters of the exit filter need be chosen.

Preferably the exit filter has a sufficiently high tear strength and/or forming a sufficiently low flow resistance that the capsule of the system, in use, is not pierced by the lid piercing means and the lid stays intact. It has been found that the exit filter having the sufficiently high tear strength and/or forming the sufficiently low flow resistance does not tear against the lid piercing means.

According to a third aspect of the invention, the capsule may be provided with both the entrance filter and the exit filter as described above. Hence, in use, the capsule is not pierced by the bottom piercing means, nor the lid piercing means, so that the capsule remains fully intact. This provides the advantage that the risk of preferential fluid paths occurring in the extractable product in the capsule and the reproducibility of the beverage strength is enhanced even more.

Preferably, the entrance filter is formed by a porous sheet, such as of filtering paper, a foil, such as a polymeric film, provided with a plurality of entrance openings, or a plurality of entrance openings provided in the bottom of the capsule of the system. Hence, the entrance filter can be provided in a simple manner.

SUMMARY

In an embodiment, the plurality of entrance openings is distributed over substantially the entire surface of the foil or the bottom, respectively. This provides the advantage that the fluid can be supplied to substantially the entire cross section of the inner space. Hence, the extractable product is wetted very homogeneously.

In a further embodiment, the plurality of entrance openings comprises side-entrance openings arranged in the circumferential wall. This provides the advantage that the extractable product is, at least partially, also wetted from the side. This provides that advantage that the fluid can be supplied to the extractable product in a very homogeneous and controlled manner.

Preferably, the exit filter is formed by a porous sheet, such as of filtering paper, or a foil, such as a polymeric film, provided with a plurality of entrance openings, or a plurality of entrance openings provided in the lid. Hence, the entrance filter can be provided in a simple manner. Also, parameters of the exit filter can be easily chosen to provide the exit filter having the sufficiently high tear strength and/or forming the sufficiently low flow resistance.

For instance, in an embodiment, the exit filter may be formed by a sheet of filtering paper. The filtering paper provides the low-cost exit filter. Moreover, parameters of the filtering paper, such as density, thickness and/or PE-content, can easily be chosen to provide the exit filter having the sufficiently high tear strength and/or forming the sufficiently low flow resistance. In an alternative preferred embodiment, the exit filter may be formed by a polymeric film provided with a plurality of exit openings. Parameters of the polymeric foil, such as density, number of exit openings, size and/or shape of exit openings, can easily be chosen to provide the exit filter having the sufficiently high tear strength and/or forming the sufficiently low flow resistance.

In an embodiment, the lid piercing means may have a blunt piercing surface. In such embodiment, the alternative capsule may, nevertheless, be pierced by the blunt piercing means, while the capsule of the system according to the invention has the exit filter having the sufficiently high tear strength and/or forming the sufficiently low flow resistance not to be pierced or torn.

It is possible that the lid piercing means comprises at least one ridge against which the lid, in use, abuts. The at least one ridge may form at least 10%, possibly at least 25% of the portion of the surface of the receptacle which, in use, coincides with the portion of the surface area of the lid overlying the second, open, end. In use, the lid may supported by the at least one ridge over at least 10%, preferably at least 25% of the portion the surface area of the lid overlying the second, open, end. The lid of the alternative capsule may be pierced by such piercing means, whereas parameters of the exit filter of the capsule of the system according to the invention may easily be chosen such that the exit filter has the sufficiently high tear strength and/or forming the sufficiently low flow resistance not to be pierced or torn.

It is possible that the lid piercing means and/or the at least one ridge comprises edges, wherein the edges are not sharp. Possibly, the edges have a radius of curvature of at least 50 µm, preferably at least 100 µm. The lid of the alternative capsule may be pierced by such piercing means, whereas parameters of the exit filter of the capsule of the system according to the invention may easily be chosen such that the exit filter has the sufficiently high tear strength and/or forming the sufficiently low flow resistance not to be pierced or torn.

In an embodiment, the plurality of exit openings is distributed over substantially the entire surface of the lid. This provides the advantage that the beverage can be drained from the capsule over substantially the entire cross section of the inner space. Hence, the beverage can flow out of the inner space very homogeneously.

According to a further aspect of the invention, the entire inner space is occupied by the extractable product. This provides the advantage that the extractable product cannot be displaced inside the inner space when the fluid flows through the capsule, so that no preferential paths can be formed.

Preferably, the bottom is integral with the circumferential wall. This provides the advantage that the capsule can simply be formed from a generally cup-shaped structure forming the circumferential wall and the bottom and a, e.g. sheet-shaped, lid. The lid may be connected to the circumferential wall, e.g. by means of gluing, welding, folding or the like.

In an embodiment the capsule comprises an inwardly extending rim at the first end, wherein the bottom is attached to the inwardly extending rim. Hence it is possible to connect the, e.g. sheet-shaped, bottom comprising the entrance filter to the rim. Thus, a simple construction of the capsule may be obtained. It is also possible that the capsule comprises an inwardly extending rim at the second end, wherein the lid is attached to the inwardly extending rim.

In an embodiment the capsule comprises an outwardly extending rim at the second end, wherein the lid is attached to the outwardly extending rim. Hence it is possible to connect the, e.g. sheet-shaped, lid comprising the exit filter to the rim. Thus, a simple construction of the capsule may be obtained. It is also possible that the capsule comprises an outwardly extending rim at the first end, wherein the bottom is attached to the outwardly extending rim.

In a special embodiment, the capsule further comprises a bottom seal at least partially removable connected to the bottom for sealing the entrance filter prior to use. Hence entering of air into the inner space via the entrance filter prior to use of the capsule may be prevented, improving shelf life of the product inside the capsule.

In a special embodiment, the capsule further comprises a lid seal at least partially removable connected to the lid for sealing the exit filter prior to use. Hence entering of air into the inner space via the exit filter prior to use of the capsule may be prevented, improving shelf life of the product inside the capsule.

According to a further aspect of the invention, the lid seal is arranged. to be partially released from the lid under the effect of fluid pressure in the inner space, while remaining attached to the lid at at least one position. Hence, the lid seal need not be removed from the capsule by a user of the capsule. When the fluid enters the inner space pressure will build up until the seal partially releases from the lid and the beverage can flow out through the exit filter. The releasable connection may e.g. be formed as a so-called peel-seal. Since the lid seal is permanently attached to the lid at at least one position, the lid seal will not fully detach from the capsule. This has the advantage, that the lid seal will automatically be discarded from the apparatus when discarding the used capsule.

In general, the circumferential wall may be formed by a flexible, optionally porous, sheet or foil, such as filtering paper, preferably integral with the bottom. Hence, a very simple and optionally environmentally friendly capsule may be provided.

Alternatively, the circumferential wall may substantially rigid. This provides that advantage that the capsule is not prone to be deformed prior to use, so that the capsule can fit into the receptacle without problems. Preferably, the capsule comprises stiffening ribs integral with the circumferential wall and/or bottom to increase the rigidity of the capsule.

In general, the circumferential wall may have any shape such as cylindrical, hemispherical, frustoconical or polygonal, such as hexagonal or octagonal.

Preferably, the extractable product comprises roasted and ground coffee. Thus, the capsule is suited for preparing a predetermined amount of coffee by supplying a predetermined amount of hot water under pressure to the capsule.

According to a further aspect of the invention, the extractable product is compacted into a tablet. This provides the advantage that the risk of preferential flow paths occurring in the compacted extractable product tablet is reduced. It will be appreciated that when using the compacted tablet, the bottom may be omitted from the capsule, as the risk of spilling extractable product is greatly reduced.

Preferably, the tablet comprises at least one bore extending from the side of the tablet facing the entrance area in the direction of the lid. The bore thus provides an infusion means for wetting the tablet in a homogeneous manner.

It is also possible that the extractable product is compacted into a plurality of tablets, preferably of mutually different packing density. It is for instance possible that the extractable product is provided as a single stack of tablets having mutually different degrees of compacting. It is for instance possible that the degree of compacting increases per tablet in the direction from the bottom to the lid. In this way the effort to completely wet a tablet will also increase in the direction from the bottom to the lid, insuring that each upstream tablet has been properly wetted when wetting a more downstream tablet, thus providing very homogeneous wetting of the total volume of extractable product.

The invention also relates to a method for preparing a beverage and a capsule for preparing a beverage.

DETAILED DESCRIPTION

Figure 1A:
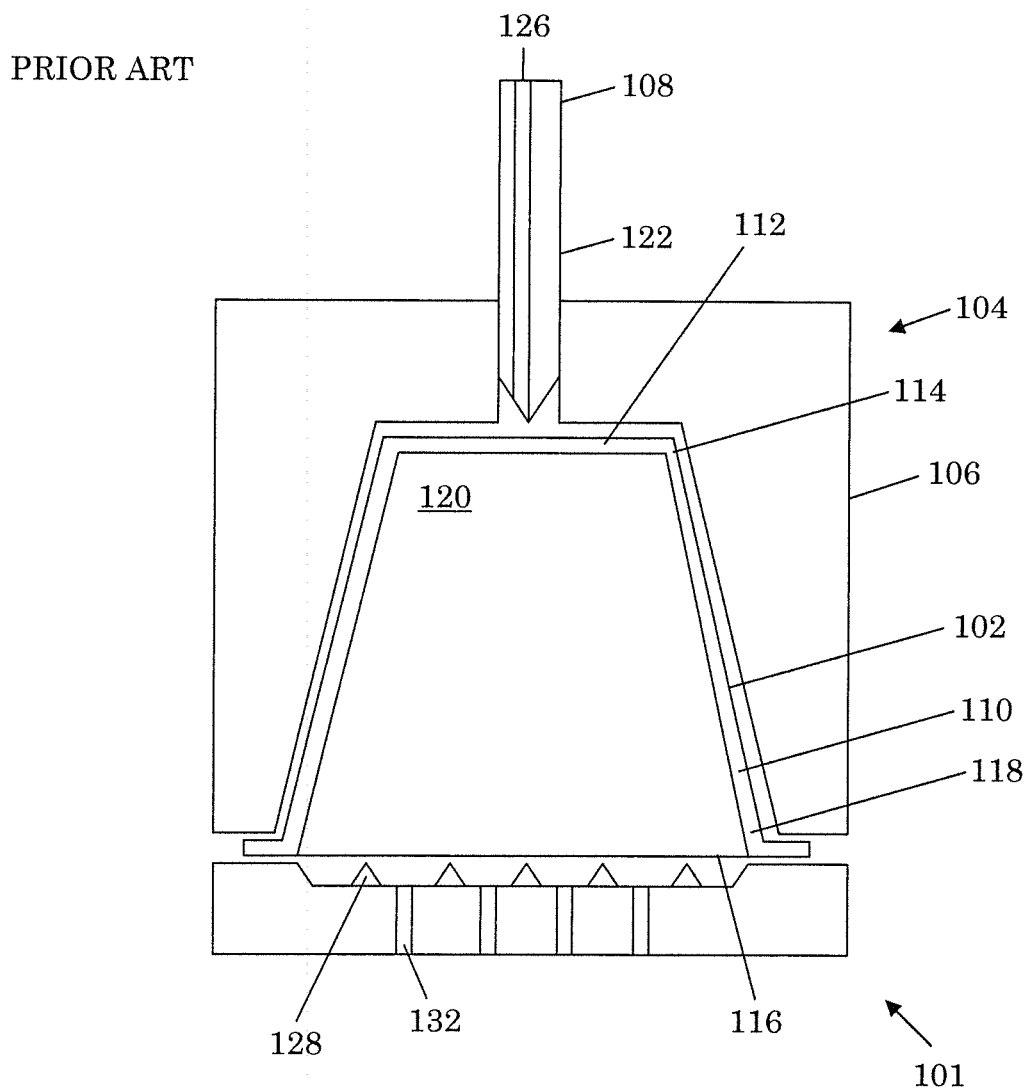
FIGS. 1a-1c shows a prior art system for preparing a beverage.
Figure 1B:
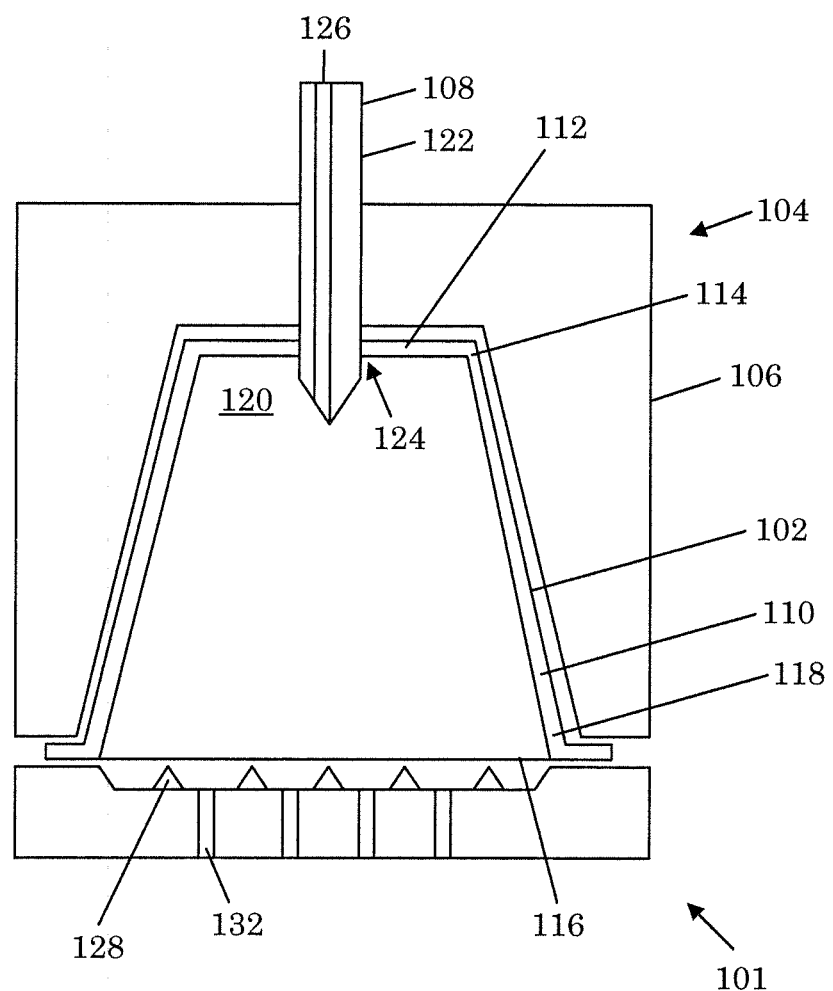
Figure 1C:
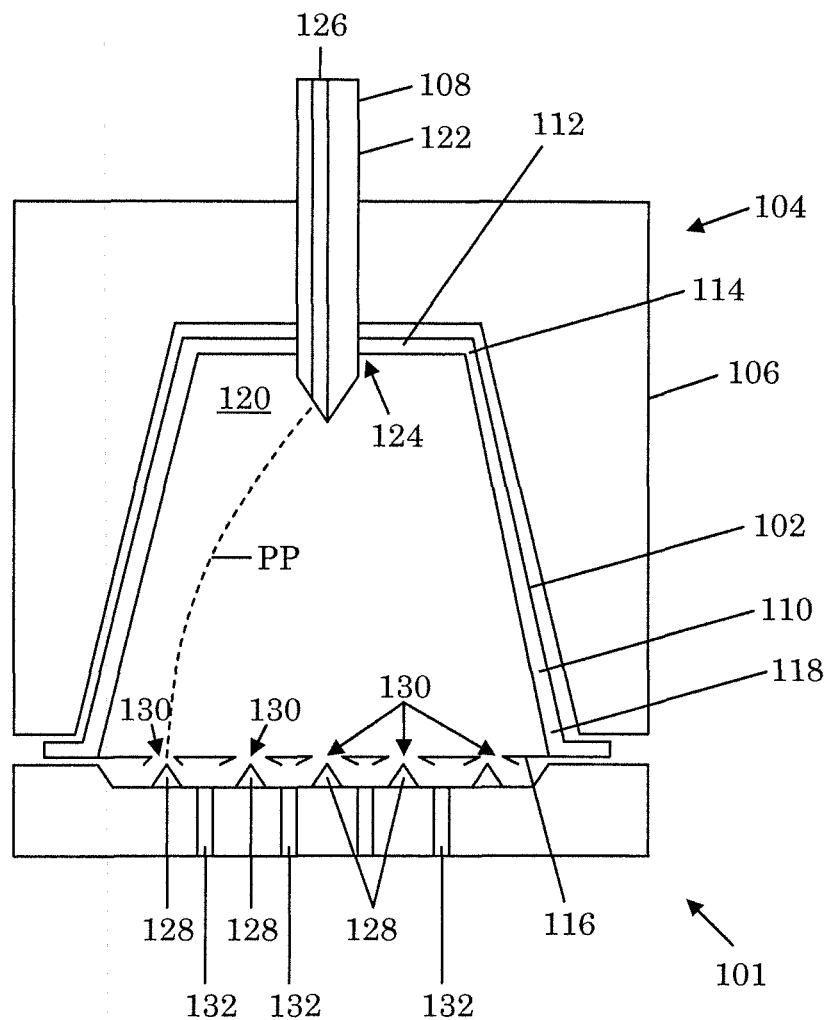

FIGS. 1a-1c show a prior art system 101 for preparing a predetermined quantity of beverage suitable for consumption using an extractable product. The system 101 comprises an exchangeable capsule 102, and an apparatus 104. The apparatus 104 comprises a receptacle 106 for holding the exchangeable capsule 102. In FIGS. 1a-1c a gap is drawn between the capsule 102 and the receptacle 106 for clarity. It will be appreciated that, in use, the capsule 102 may lie in contact with the receptacle 106. Commonly, the receptacle 106 has a shape complementary to the shape of the capsule 102. The apparatus 104 further comprises a fluid dispensing device 108 for supplying an amount of a fluid, such as water, under a pressure, of e.g. 9 bars, to the exchangeable capsule 102.

In the system 101 shown in FIGS. 1a-1c, the exchangeable capsule 102 comprises a circumferential wall 110, a bottom 112 closing the circumferential wall 110 at a first end 114, and a lid 116 closing the circumferential wall 110 at a second end 118 opposite the bottom 112. The circumferential wall 110, the bottom 112 and the lid 116 enclose an inner space 120 comprising the extractable product.

The system 101 of FIGS. 1a-1c comprises bottom piercing means 122 intended for piercing the capsule 102. FIG. 1a shows the bottom piercing means 122 in a retracted position. FIG. 1b shows the bottom piercing means 122 in an extended position for creating an entrance opening 124 in the bottom 112 for supplying the fluid to the extractable product through the entrance opening 124. In FIGS. 1a-1c the piercing means 122 comprise a bore 126 through which the fluid can be supplied to the extractable product contained in the inner space 120. The system 101 of FIGS. 1a-1c further comprises lid piercing means 128, here embodied as protrusions, intended for piercing the lid 116 of the capsule 102.

The system 101 shown in FIGS. 1a-1c is operated as follows for preparing a cup of coffee, wherein the extractable product is roasted and ground coffee.

The capsule 102 is placed in the receptacle 106 (see FIG. 1a). The bottom piercing means are activated to pierce the bottom 112 of the capsule 102 (see FIG. 1b) for creating the entrance opening 124. The fluid, here hot water under pressure, is supplied to the extractable product in the inner space 120 through the entrance opening 124. The water will wet the coffee grounds and extract the desired substances to form the coffee beverage.

During supplying the water under pressure to the inner space 120, the pressure inside the capsule 102 will rise. The rise in pressure will cause the lid 116 to deform and be pressed against the lid piercing means 128. Once the pressure reaches a certain level, the tear strength of the lid 116 will be surpassed and the lid will rupture against the lid piercing means 128, creating exit openings 130 (see FIG. 1c). The prepared coffee will drain from the capsule 102 through the exit openings 130 and outlets 132 of the receptacle 106, and may be supplied to a container such as a cup (not shown).

During preparation of the beverage in the system 101 shown in FIGS. 1a-1c preferential flow paths may exist in the extractable product inside the inner space 120 of the capsule 102. These preferential paths may extend from the entrance opening 124 to the exit openings 130. One such possible preferential path is indicated with line PP in FIG. 1c.

Figure 2:
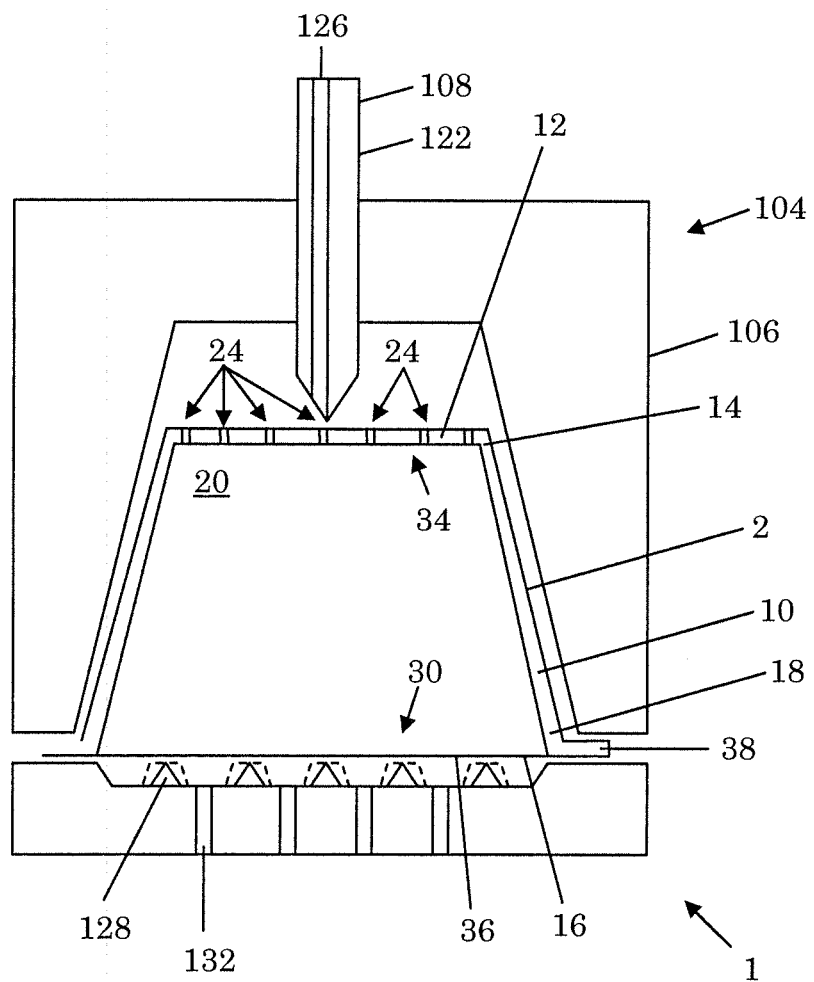
FIG. 2 shows a first embodiment of a system according to the invention.

FIG. 2 shows an example of a first embodiment of a system 1 according to the invention for preparing a predetermined quantity of beverage suitable for consumption using an extractable product. The system 1 comprises an exchangeable capsule 2, and an apparatus 104. The apparatus 104 comprises a receptacle 106 for holding the exchangeable capsule 2. In this example, the receptacle 106 has a shape complementary to the shape of the capsule 2. In FIG. 2 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, such as water, under pressure to the exchangeable capsule 2.

In the system 1 shown in FIG. 2, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack.

According to a first aspect of the invention, the system 1 of FIG. 2 comprises bottom piercing means 122 intended for piercing the prior art capsule 102 as shown in FIGS. 1a-1c. FIG. 2 shows the bottom piercing means in an extended position, intended for creating the entrance opening 124 in the bottom 112 of the prior art capsule 102. According to the invention, the capsule 2 comprises an entrance filter 34 which is positioned at a distance from the bottom piercing means 12, such that the capsule 2 is not pierced by the bottom piercing means 122 and the bottom 12 stays intact when the bottom piercing means is brought in the extended position.

In FIG. 2 the piercing means 122 comprise a bore 126 through which the fluid is supplied to an inner space of the receptacle 106. The fluid, here hot water under a pressure of e.g. more than 6 bars, will flow through the entrance filter 34 into the inner space 20 of the capsule 2 for extracting desired substances from the extractable product, in this example approximately 7 grams of roasted and ground coffee, for preparing, in this example the single cup of the beverage, here coffee.

Thus, more in general, in the example of FIG. 2, the bottom 12 comprises an entrance area, formed by the entrance filter 34, and the system 1 is arranged for bringing the fluid dispensing device 108 in fluid connection with the entrance area for supplying the fluid to the extractable product for preparing the beverage.

In the example of FIG. 2, the circumferential wall 10 is substantially rigid. The circumferential wall may e.g. comprise a plastics material and may be formed by e.g. injection moulding, vacuum-forming, thermoforming or the like. In the example of FIG. 2 the bottom 12 is integral with the circumferential wall. In this example the entrance filter 34 is formed by a plurality of entrance openings 24 in the bottom 12. In this example the plurality of entrance openings 24 is distributed over substantially the entire bottom 12. Thus, the fluid is supplied to the extractable product via the plurality of entrance openings 24, which causes the extractable product to be wetted over substantially the entire cross section of the capsule 2. Hence, a very homogeneous supply of fluid to the extractable product is obtained. Thus, the risk of occurrence of preferential paths via which the fluid flows through the extractable product is greatly reduced.

According to a second aspect of the invention, which may be practiced in addition to the above described first aspect or separate thereof, the system 1 of FIG. 2 comprises lid piercing means 128 intended for piercing the lid 116 of the prior art capsule 102 when the lid 116 sufficiently presses against the lid piercing means 128 under the influence of the pressure of the fluid and/or beverage in the capsule 102 for creating at least one exit opening 130 through which the beverage can drain from the prior art capsule 102. According to the invention, the capsule 2 comprises an exit filter 36, through which the beverage can drain from the capsule 2. The exit filter 36 is arranged to having a sufficiently high tear strength not to be pierced by the lid piercing means 128 under the influence of the pressure inside the capsule 2. Alternatively, or additionally, the exit filter 36 forms a sufficiently low flow resistance for the beverage exiting the capsule 2, that the exit filter 36 is not pressed against the lid piercing means 128 with sufficient force to be pierced by the lid piercing means 128 and the lid stays intact. Hence, the exit filter 36 is adapted to the lid piercing means 128 such that the capsule 2, in use, is not pierced by the lid piercing means 128 and the lid 16 stays intact. More in general it applies that the exit filter 36 and the lid piercing means 128 are adapted to each other such that the capsule 2, in use, is not pierced by the lid piercing means 128 and the lid 16 stays intact.

In the example of FIG. 2 the exit filter 36, forming an exit area of the capsule 2, through which the beverage, here coffee, can drain from the capsule, is formed by a porous sheet, such as filter paper. In this example the entire lid 16 is formed as the exit filter 36. In the example of FIG. 2, the capsule 2 comprises an outwardly extending rim 38 at the second end 18, wherein the lid 16 is attached to the outwardly extending rim 38, e.g. by gluing, welding or the like. Hence, in this example the exit filter 36, i.e. the porous sheet, is attached to the outwardly extending rim 38.

In this example the exit filter 36 forms a substantially continuous fluid-permeable sheet spanning substantially the entire second, open end 18 of the capsule 2. Thus, the fluid can drain from the capsule 2 over a large area. Hence, a very homogeneous drain of beverage from the extractable product is obtained. Thus, the risk of occurrence of preferential paths via which the fluid flows through the extractable product is greatly reduced.

In general, parameters of the exit filter of the capsule 2 of the system 1 according to the invention can be chosen such that the exit filter does not tear or rupture, e.g. has the sufficiently high tear strength and/or forming the sufficiently low flow resistance not to be pierced or torn. It will be appreciated that the lid and/or the exit filter may deform against the lid piercing means, although it will not rupture or be torn. When the exit filter 36 is e.g. made of filtering paper, parameters of the filtering paper, such as density, thickness and/or PE-content, can easily be chosen to provide the exit filter having the sufficiently high tear strength and/or forming the sufficiently low flow resistance. Alternatively, when the exit filter 36 is e.g. formed by a polymeric film provided with a plurality of exit openings, parameters of the polymeric foil, such as density, thickness, number of exit openings, size and/or shape of exit openings, can easily be chosen to provide the third wall having the sufficiently high tear strength and/or forming the sufficiently low flow resistance.

In the example of FIG. 2, the lid piercing means 128 are shown having sharp toothed points intended for piercing the lid. It will be appreciated that, alternatively, the lid piercing means 128 may have blunt piercing surfaces, e.g. as indicated with dashed lines in FIG. 2. In such embodiment, the prior art capsule 102 may, nevertheless, be pierced by the blunt piercing means 128, e.g. when the lid 116 consists of a sheet of aluminium foil. Parameters of the exit filter of the capsule 2 of the system according to the invention can be chosen such that the exit filter has the sufficiently high tear strength and/or forms the sufficiently low flow resistance not to be pierced or torn. It will be appreciated that when the lid piercing means are blunt, the parameters of the exit filter may be chosen to suit these blunt piercing means. When the piercing means are blunt, the exit filter may e.g. be thinner than when the lid piercing means are sharp, while guaranteeing that the exit filter has the sufficiently high tear strength and/or forming the sufficiently low flow resistance not to be pierced or torn.

It is possible that the lid piercing means comprise ridges against which the lid, in use, abuts. Such ridges may be formed by the blunt piercing means 128 as shown with dashed lines in FIG. 2. The ridges may e.g. form at least 10%, possibly at least 25% of the portion of the surface of the receptacle 106 which, in use, coincides with the portion of the surface area of the lid 16 overlying the second, open, end 18. Hence, in use, the lid 16 may be supported by the ridges over, e.g. at least 10%, preferably at least 25%, of the portion the surface area of the lid 16 overlying the second, open, end 18. As already indicated, the lid 116 of the prior art capsule 102 may be pierced by such ridges, whereas parameters of the exit filter 36 of the capsule 2 of the system 1 according to the invention may easily be chosen such that the exit filter has the sufficiently high tear strength and/or forms the sufficiently low flow resistance not to be pierced or torn. It will be appreciated that when the lid piercing means comprise ridges, the parameters of the exit filter may be chosen to suit such lid piercing means.

In the example of FIG. 2, the ridges comprise edges which are not sharp. In this example a radius of curvature of the edges is approximately 50 µm, although other radii are conceivable, such as 100, 200 or 500 µm. The prior art capsule 102 may, nevertheless, be pierced by the blunt piercing means 128, e.g. when the lid 116 consists of a sheet of aluminium foil. It will be appreciated that when the lid piercing means comprise non-sharp edges, the parameters of the exit filter may be chosen to suit such lid piercing means. Parameters of the exit filter of the capsule 2 of the system according to the invention can be chosen such that the exit filter has the sufficiently high tear strength and/or forming the sufficiently low flow resistance not to be pierced or torn.

It is also possible that the ridges of the lid piercing means 128 have a convex top against which the lid 16 abuts. Hence, when the lid, in use, is pressed against the ridges, the surface area over which the lid is supported by the ridges increases, thus reducing the local pressure exerted on the lid by the ridges. Thus it is possible to provide, in an easy manner, that the lid, in use, does not tear and/or rupture and stays intact.

FIGS. 3a-3d show embodiments of capsules 2 according to the invention.

Figure 3A:
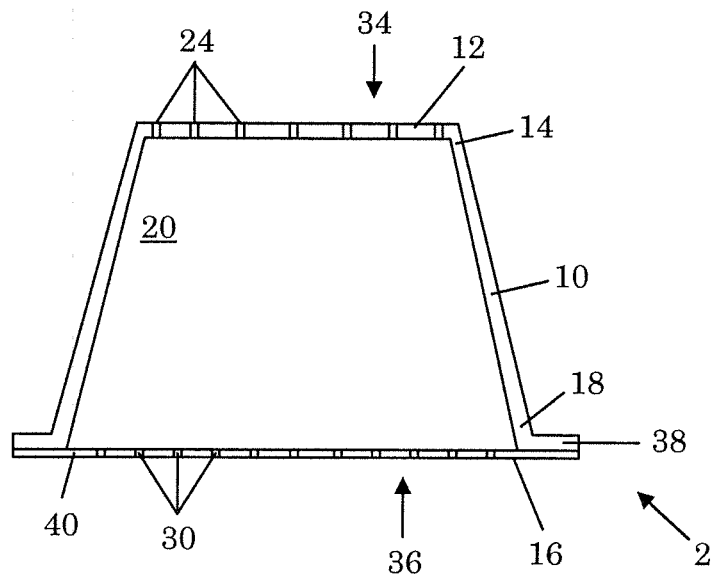
FIGS. 3a-3d show embodiments of capsules according to the invention.

In FIG. 3a the bottom 12 is integral with the circumferential wall 10 like in FIG. 2. The entrance filter 34 is formed by the plurality of entrance openings 24 in the bottom 12. The exit filter 36 is formed by a foil 40, e.g. a flexible polymeric foil, provided with a plurality of exit openings 30.

Figure 3B:
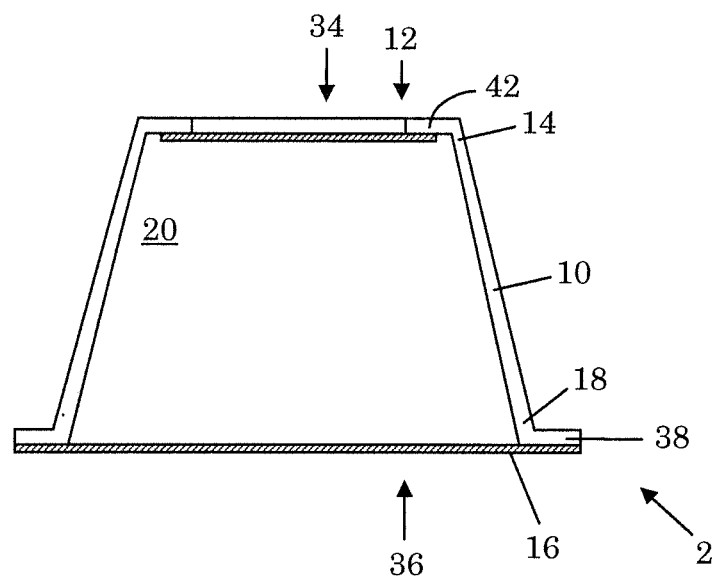

In FIG. 3b the exit filter 36 is formed by the flexible porous sheet, such as filter paper, like in FIG. 2. In FIG. 3b the entrance filter 34 is also formed by a flexible porous sheet, such as filter paper. In this example the entrance filter is attached to an inwardly extending rim 42. In this example, the entrance filter 34 is attached to the inner side of the inwardly extending rim 42. This maximizes the internal volume of the capsule 2, as the rim thickness is not present in the inner space 20 of the capsule 2.

Figure 3C:
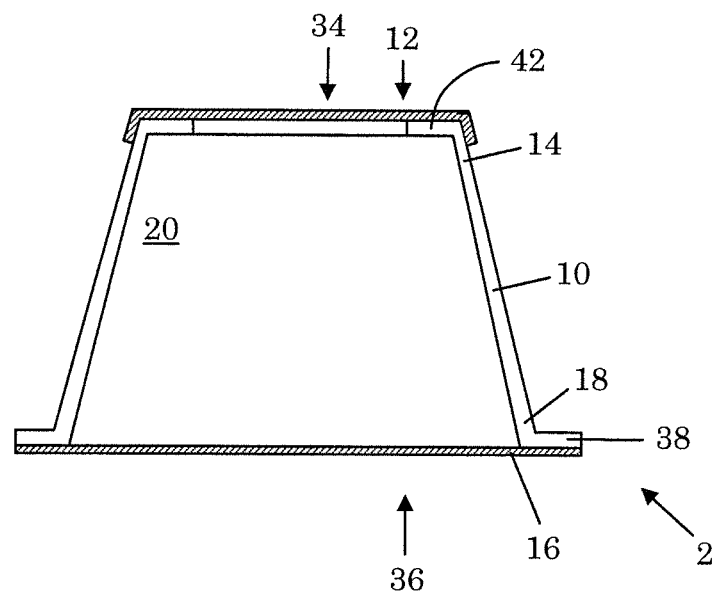

In FIG. 3c the exit filter 36 is formed by the flexible porous sheet, such as filter paper, like in FIGS. 2 and 3b. In FIG. 3c the entrance filter 34 is also formed by a flexible porous sheet, such as filter paper. In this example, the entrance filter 34 is attached to the outer side of the inwardly extending rim 42. Hence, the risk is reduced that the fluid under pressure tears the entrance filter 34 from the inwardly extending rim 42. It is possible that the entrance filter 34 overhangs a circumferential edge of the bottom. Hence, a larger surface area is available for attaching the entrance filter 34 to the bottom 12 and the circumferential wall 10, resulting in a stronger bond.

Figure 3D:
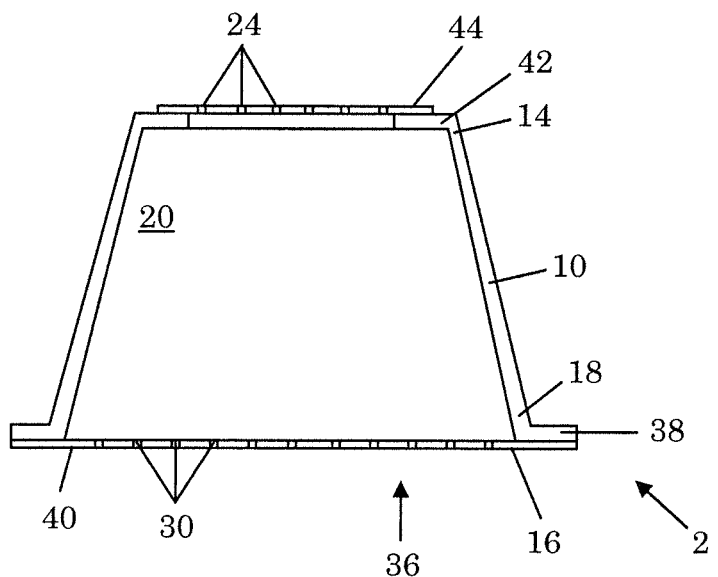

In FIG. 3d the exit filter 36 is formed by a foil 40, e.g. a flexible polymeric foil, provided with a plurality of exit openings 30, as in FIG. 3a. In FIG. 3d the entrance filter 34 is also formed by a foil 44, provided with the plurality of entrance openings 24.

In all embodiments of FIGS. 3a-3d the exit filter is formed by a flexible sheet-shaped material. More specifically, in all embodiments of FIGS. 3a-3d the lid is solely formed by the flexible sheet-shaped material. It has been found that in general no supporting structure, such as a substantially rigid grid, e.g. downstream of the exit foil, is required to support the exit foil to prevent the exit foil from tearing an/or rupturing.

In all embodiments of FIGS. 3b-3d the entrance filter is formed by a flexible sheet-shaped material. More specifically, in all embodiments of FIGS. 3b-3d the entrance area is solely formed by the flexible sheet-shaped material. It has been found that in general no supporting structure, such as a substantially rigid grid, e.g. downstream of the entrance foil, is required to support the entrance foil to prevent the entrance foil from tearing an/or rupturing.

In all embodiments of FIGS. 3a-3d the exit filter forms the outermost boundary of the capsule in the axial direction thereof.

It will be appreciated that the capsule 2 may comprise any entrance filter according to any one of the shown embodiments in combination with any exit filter according to any one of the shown embodiments. Although not shown, it is possible that the lid comprises a substantially rigid wall provided with the exit openings 30.

In general, the exit openings 30, or pores of the porous sheet, are dimensioned such that a dimension of the opening 30 or pore is sufficiently small to retain the extractable product, such as ground coffee, inside the capsule 2. Also in general, the entrance openings 24, or pores of the porous sheet, are dimensioned such that a dimension of the opening 24 or pore is sufficiently small to retain the extractable product, such as ground coffee, inside the capsule 2.

In general, the entrance openings 24 are preferably distributed over substantially the entire surface of the bottom or the foil 44, at least substantially the entire surface of the opening defined by the inwardly extending rim 42. Optionally, entrance openings 24 are also present in the circumferential wall 10, e.g. in the portion of the circumferential wall 10 near the first end 14. This allows homogeneous supply of the fluid to the extractable product inside the capsule 2.

In general, the exit openings 30 are preferably distributed over substantially the entire surface of the lid or the foil 40, at least substantially the entire surface of the opening defined by the outwardly extending rim 38. This allows homogeneous draining of the beverage from the extractable product inside the capsule 2.

In the examples of FIGS. 2, 3a-3d the entrance openings 24 and exit openings 30 have a circular cross section. The openings 24, 30 with circular cross section are easily manufactured. Optionally the cross section of the entrance openings 24 tapers (narrows) towards the inner space 20. This provides the advantage that the entrance openings act as nozzles that cause a jet of fluid to enter the inner space 20.

It will be appreciated that the entrance openings 24 and/or exit openings 30 may also have alternative shapes. The openings 24,30 may for instance have the shape of elongate slits. Preferably, the small dimension of the slits is sufficiently small to retain the extractable product inside the capsule 2.

In a special embodiment, the slits may have a shape that defines a tongue in the plane of the bottom. The slits may then be substantially U-shaped, such as semi-circular, horseshoe shaped, rectangular or V-shaped. This has the advantage that the tongue may be bent out of the plane of the bottom under the effect of the flow of fluid through the opening defined by the tongue. Thus, a larger volume flow of fluid may be attained. If the bottom is made of a resilient material, the tongue will bend back into the plane of the bottom once the flow of fluid stops, thus preventing the spilling of extractable product (prior to and) after preparation of the beverage. It will be appreciated that slits defining a tongue may be applied in the lid mutatis mutandis.

Figure 4A:
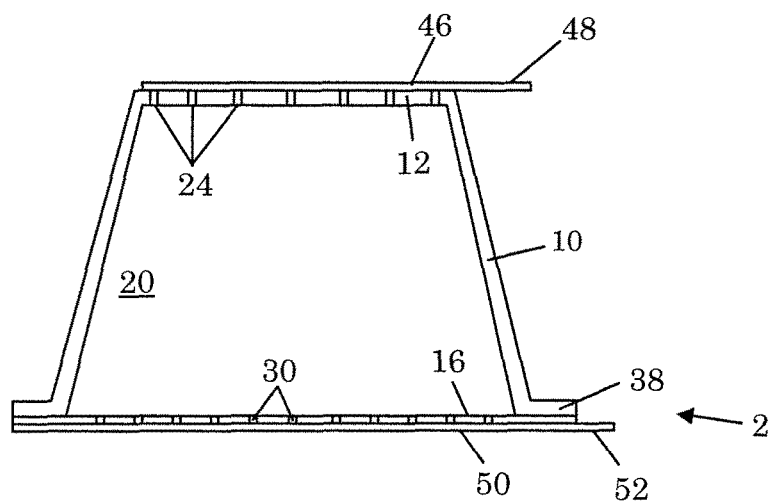
FIGS. 4a, 4b and 4c show examples of further embodiments of a capsule 2 according to the invention.

FIG. 4a shows an example of a further embodiment of a capsule 2 according to the invention. FIG. 4a shows a modification of the capsule shown in FIG. 3a. It will be appreciated that this modification may be applied to any capsule 2 referred to hereinabove. In the example of FIG. 4a the capsule 2 further comprises a bottom seal 46. The bottom seal 46 closes off the entrance openings 24 (or the porous sheet) prior to use. The bottom seal 46 is at least partially removable connected to the bottom 12. In this example the bottom seal 46 comprises a lip 48 to allow easy removal of the bottom seal 46 by a user of the capsule 2. In FIG. 4a the capsule 2 further comprises a lid seal 50. The lid seal 50 closes off the exit openings 30 (or the porous sheet) prior to use. The lid seal 50 is at least partially removable connected to the lid 16. In this example the lid seal 50 comprises a lip 52 to allow easy removal of the lid seal 50 by a user of the capsule 2. The bottom seal 46 and lid seal 50 improve shelf life of the product inside the capsule by preventing air to enter the capsule via the openings 24,30 or porous sheet.

In a special embodiment (not shown) the lip 46 of the bottom seal 46 is connected to the lip 52 of the lid seal 50. Thus, the bottom seal 46 and the lid seal 50 can be made unitary. Hence, it may be prevented that a user accidentally forgets to remove one of the bottom seal and the lid seal.

Figure 4B:
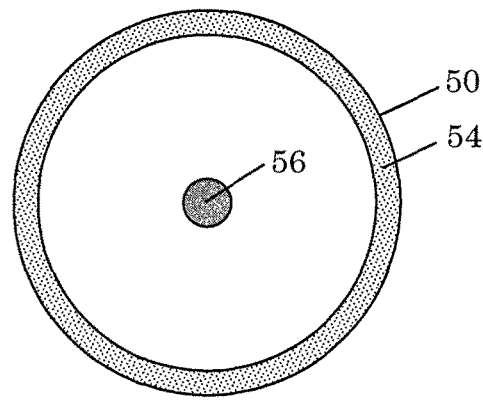
Figure 4C:
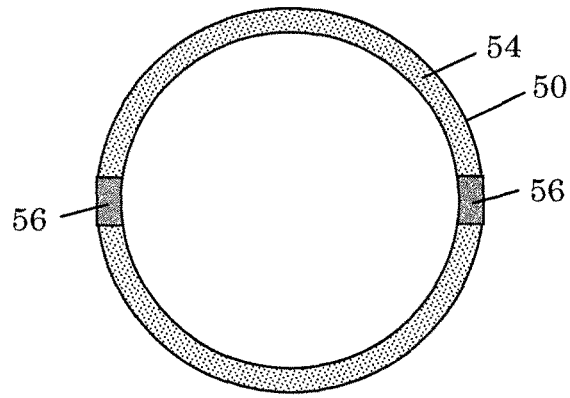

FIGS. 4b and 4c shows an example of a plan view of a further embodiment of the capsule 2 when viewed from the side of the lid 16. In FIGS. 4b and 4c the capsule comprises the lid seal 50. The lid seal 50 is attached to the lid 16 with a releasable seal 54. In this example the releasable seal forms a circumferential seal adjacent a circumferential edge of the lid 16. The releasable seal 54 is arranged to be released from the lid 16 under the effect of fluid pressure in the inner space 20. The releasable seal may e.g. be a peel-seal of predetermined release-strength. Hence, it is not required that the user removes the lid seal 50 from the capsule 2, as the seal is opened automatically while preparing the beverage.

In FIGS. 4b and 4c the lid seal 50 is further attached to the lid 16 with a permanent connection 56. The permanent connection may e.g. be a glued or welded connection. In FIG. 4b the permanent connection is positioned adjacent the centre of the lid. In FIG. 4c the permanent connection 56 is positioned adjacent the circumferential edge of the lid. This provides the advantage that the releasable seal may be released under the effect of pressure for allowing the draining of the beverage from the capsule, while the lid seal 50 remains attached to the lid 16 at at least one position. Hence, the lid seal 50 need not be discarded separately, improving ease of use, and cannot be lost.

It will be appreciated that instead of, or in addition to, being attached to the lid, the lid seal 50 may also be attached to the rim positioned near the second end 18, and/or to the circumferential wall 14.

It will be appreciated that the capsule 2 may in a similar way alternatively, or additionally be provided with the bottom seal 46, e.g. positioned on the inner side of the bottom 12, arranged to be released from the bottom 12 under the effect of pressure of fluid supplied to the capsule 2, and optionally provided with at least one permanent connection between the bottom and the bottom seal 46. It will be appreciated that instead of, or in addition to, being attached to the bottom 12, the bottom seal 46 may also be attached to the rim positioned near the first end 14, and/or to the circumferential wall 14.

It will also be appreciated that the lid seal 50 and/or the bottom seal 46 may also be used in conjunction with alternative capsules, wherein the lid does not form an outermost boundary of the capsule in the axial direction thereof, e.g. a capsule having an axially extending rim extending beyond the lid.

Preferably, the circumferential wall is substantially rigid. Hence, the capsule will not be prone to deform by shipping and/or handling, so that the capsule 2 will always fit in the receptacle 106. In addition, the circumferential wall is preferably resilient, so that any possible deformation of the circumferential first wall will be reversed once the force causing the deformation is removed. In order to improve rigidity of the capsule 2, the capsule 2 may comprise stiffening ribs integral with the circumferential wall 10. The stiffening ribs may extend from the first end 14 towards the second end 18. Alternatively, or additionally, the stiffening ribs may extend in a circumferential direction. When the bottom 12 is integral with the circumferential wall 10, the stiffening ribs may also be integral with the bottom 12.

Nevertheless, it is possible that the circumferential wall is formed by a flexible, e.g. porous, sheet or foil, preferably integral with the bottom. Hence, substantially the entire capsule may be manufactured of the flexible sheet, reducing the amount of material required for providing the capsule.

Optionally, the outwardly extending rim may be substantially rigid to enhance ease of handling of the capsule.

In the examples the circumferential wall is substantially frustoconical. It will be appreciated that the capsule according to the invention is not limited to this shape. The circumferential wall may e.g. be cylindrical, hemispherical, or polygonal, such as hexagonal, octagonal, etc.

Figure 5A:
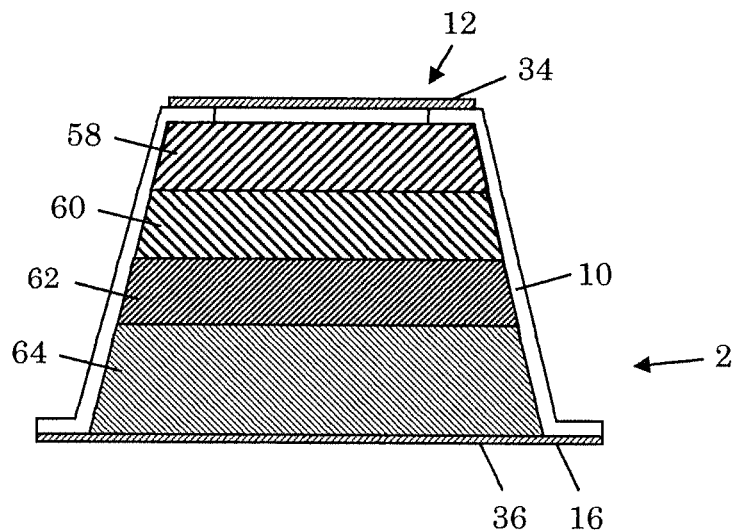
FIGS. 5a and 5b show examples of even further embodiments of a capsule according to the invention.

According to a further aspect of the invention, the extractable product in the inner space 20 is compacted. FIG. 5a shows an example wherein the extractable product is compacted into a plurality of, in this example four, tablets 58,60,62,64. In FIG. 5a the tablets are stacked inside the inner space 20. In FIG. 5a, each tablet 58,60,62,64 spans substantially the entire cross section of the capsule 2. In this example a density, i.e. a degree of compaction, of the tablets is different for each of the tablets. The density of the tablets 58,60,62,64 increases in the direction from the bottom 12 to the lid 16. This provides the advantage that the fluid will more easily wet a tablet of lower density than a tablet of higher density, so that each upstream tablet is properly wetted while the water wets a subsequent downstream tablet. Thus, highly homogeneous wetting of the extractable product is achieved. Although the example shows four stacked tablets, it will be appreciated that any number of tablets may be used.

Figure 5B:
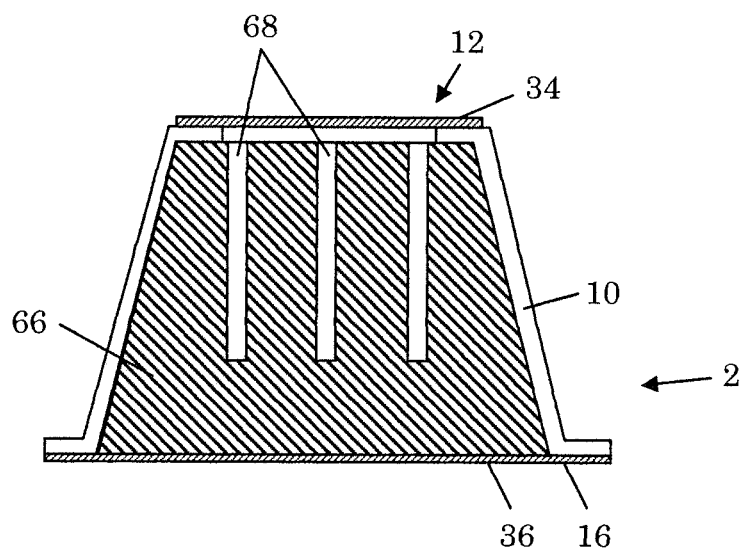

FIG. 5b shows an example of a capsule 2 comprising a single tablet 66 of compacted extractable product. In the example of FIG. 5b the tablet 66 comprises bores 68 extending into the tablet 66 from the side of the tablet 66 facing the bottom 12 in the direction of the lid 16. The length of the bores 68 is shorter than the thickness of the tablet 66 in the direction along the bore 68. Thus, the bores 68 do not form shortcut passages for the fluid through the tablet 66, but provide the fluid a passage into the core of the tablet 66. These bores allow a predetermined penetration of the fluid into the tablet. Thus, a preferred wetting of the compacted extractable product may be obtained.

In the examples of FIGS. 5a and 5b the entrance filter 34 and exit filter 36 of the capsule are substantially as shown in FIG. 3c. It will be appreciated that the tablet 66 or plurality of tablets 58,60,62,64 may be used in conjunction with any capsule 2 referred to hereinabove. It will also be appreciated that if the extractable product is compacted into the tablet(s) the bottom 12 of the capsule is not strictly required, since the extractable product is not likely to spill from the capsule prior to use.

It will be appreciated that the capsules 2 referred to hereinabove may also be used in alternative apparatus for preparing the beverage, for instance in apparatus not provided with the bottom piercing means and/or not provided with the lid piercing means.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule 2 is contained in an air-tight wrapping prior to use to improve shelf-life.

It is also possible that the bottom comprises a recessed area for receiving the bottom piercing means without the bottom being pierced, for increasing the capsule volume.

In above examples, the exit filter forms the lid. It is also possible that the exit filter forms part of the lid. The lid may for instance be partially porous and/or partially perforate.

In above examples, the entrance filter forms the bottom. It is also possible that the entrance filter forms part of the bottom. The bottom may for instance be partially porous and/or partially perforate.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A capsule for preparing a predetermined quantity of beverage suitable for consumption using an extractable product, comprising
    a circumferential wall, a bottom closing the circumferential wall at a first end, and a lid closing the circumferential wall at a second end opposite the bottom, wherein the wall, bottom and lid enclose an inner space comprising the extractable product,
    wherein the bottom comprises an entrance area arranged for supplying there through a fluid under pressure to the extractable product for preparing the beverage,
    wherein the entrance area of the capsule comprises an entrance filter for supplying the fluid to the extractable product there through, wherein the entrance filter is formed by a plurality of openings provided in the bottom of the capsule,
    wherein the lid comprises an exit area formed by a foil for draining there through the prepared beverage from the capsule,
    wherein the exit area comprises an exit filter through which the beverage can drain from the capsule, wherein the exit filter is formed by a plurality of exit openings provided in the foil; and
    wherein the capsule further comprises a lid seal at least partially removably connected to the lid for sealing the exit filter prior to use.

2. The capsule of claim 1, wherein the entrance area of the capsule comprises an entrance filter for supplying the fluid to the extractable product there through.

3. The capsule of claim 1, wherein the plurality of entrance openings is distributed over substantially the entire surface of the foil or the bottom, respectively.

4. The capsule of claim 1, wherein the entrance openings have a circular cross section.

5. The capsule of claim 1, wherein the entrance openings are slits.

6. The capsule of claim 1, wherein the entrance openings are arranged to open under pressure.

7. The capsule of claim 1, wherein the exit filter forms an outermost boundary of the capsule in an axial direction thereof.

8. The capsule of claim 1, wherein the plurality of exit openings is distributed over substantially the entire surface of the lid.

9. The capsule of claim 1, wherein the entire inner space is occupied by the extractable product.

10. The capsule of claim 1, wherein the capsule comprises an inwardly extending rim at the first end, wherein the bottom is attached to the inwardly extending rim.

11. The capsule of claim 10, wherein the entrance filter is attached to the inwardly extending rim.

12. The capsule of claim 1, wherein the capsule comprises an outwardly extending rim at the second end, wherein the lid is attached to the outwardly extending rim.

13. The capsule of claim 12, wherein the exit filter is attached to the outwardly extending rim.

14. The capsule of claim 1, wherein the bottom extends to the circumferential first wall.

15. The capsule of claim 14, wherein the entrance filter extends to the circumferential first wall.

16. The capsule of claim 2, wherein the capsule further comprises a bottom seal at least partially removable connected to the bottom for sealing the entrance filter prior to use.

17. The capsule of claim 1, wherein the lid seal is arranged to be partially released from the lid under the effect of fluid pressure in the inner space, while remaining attached to the lid at at least one position.

18. The capsule of claim 1, wherein the circumferential wall is formed by a sheet or foil, preferably integral with the bottom.

19. The capsule of claim 1, wherein the circumferential wall is cylindrical, hemispherical, frustoconical or polygonal, such as hexagonal or octagonal.

20. The capsule of claim 1, wherein the extractable product comprises roasted and ground coffee.

21. The capsule of claim 1, wherein the extractable product is compacted into a tablet.

22. The capsule of claim 21, wherein the tablet comprises at least one bore extending from the side of the tablet facing the entrance area in the direction of the lid.

23. The capsule of claim 1, wherein the extractable product is compacted into a plurality of tablets, preferably of mutually different packing density.

24. The capsule of claim 1, wherein the lid extends to the circumferential first wall.

25. The capsule of claim 14, wherein the exit filter extends to the circumferential first wall.

26. The capsule of claim 16, wherein the bottom seal comprises a lip, the lid seal comprises a lip, and the lip of the bottom seal is connected to the lip of the lid seal.

27. The capsule of claim 16, wherein the bottom seal and the lid seal are made unitary.

* * * * *